(12) United States Patent
Von Aswege

(10) Patent No.: US 12,049,866 B2
(45) Date of Patent: Jul. 30, 2024

(54) METHOD FOR OPERATING A WIND TURBINE, WIND TURBINE, AND WIND PARK

(71) Applicant: Wobben Properties GmbH, Aurich (DE)

(72) Inventor: Enno Von Aswege, Großefehn (DE)

(73) Assignee: Wobben Properties GmbH, Aurich (DE)

( * ) Notice: Subject to any disclaimer, the term of this patent is extended or adjusted under 35 U.S.C. 154(b) by 894 days.

(21) Appl. No.: 16/972,708

(22) PCT Filed: Jun. 4, 2019

(86) PCT No.: PCT/EP2019/064540
§ 371 (c)(1),
(2) Date: May 21, 2021

(87) PCT Pub. No.: WO2019/234053
PCT Pub. Date: Dec. 12, 2019

(65) Prior Publication Data
US 2024/0026857 A1    Jan. 25, 2024

(30) Foreign Application Priority Data
Jun. 8, 2018   (DE) ................. 10 2018 113 706.0

(51) Int. Cl.
*F03D 7/02*    (2006.01)
*F03D 7/04*    (2006.01)

(52) U.S. Cl.
CPC .......... *F03D 7/0224* (2013.01); *F03D 7/048* (2013.01); *F05B 2270/101* (2013.01); *F05B 2270/327* (2013.01); *F05B 2270/328* (2013.01)

(58) Field of Classification Search
CPC . F03D 7/024; F03D 7/022; F03D 7/02; F03D 7/048; F03D 7/04; F05B 2270/101; F05B 2270/327; F05B 2270/328
See application file for complete search history.

(56) References Cited

U.S. PATENT DOCUMENTS

| 4,297,076 A | 10/1981 | Donham et al. |
| 10,619,623 B2 | 4/2020 | Caponetti et al. |

(Continued)

FOREIGN PATENT DOCUMENTS

| CA | 1121455 A | 4/1982 |
| CN | 102644546 A | 8/2012 |

(Continued)

OTHER PUBLICATIONS

Ying, et al., "Based on a Frequency Modulation Method and System of Tracing Optimal Power Curve Double-fed Wind Generating Set," 2016, CPO, CN 106208161 A (Year: 2016).*

(Continued)

*Primary Examiner* — Woody A Lee, Jr.
*Assistant Examiner* — Joshua R Beebe
(74) *Attorney, Agent, or Firm* — Seed IP Law Group LLP

(57) ABSTRACT

Provided are a method for operating a wind turbine, wherein the wind turbine has an aerodynamic rotor with at least one rotor blade which is mounted on a rotor hub of the rotor, wherein a blade angle of the at least one rotor blade can be adjusted about its longitudinal axis with respect to the rotor hub, and a corresponding wind turbine. The method has the following steps: providing current wind properties; providing an actual blade angle of the rotor blade or an average value of all actual blade angles of the rotor blades; determining a steady-state blade angle of the at least one rotor blade which, taking into account known rotor properties, the electrical system and the wind properties, leads to a desired (Continued)

steady operating state of the wind turbine; comparing the steady-state blade angle with the actual blade angle or the average value of all actual blade angles; adapting an operation of the wind turbine if the steady-state blade angle deviates significantly from the actual blade angle or the average value of all actual blade angles.

19 Claims, 7 Drawing Sheets

(56) References Cited

U.S. PATENT DOCUMENTS

| | | | |
|---|---|---|---|
| 11,136,962 B2 | 10/2021 | Pedersen | |
| 2007/0205602 A1* | 9/2007 | Willey | F03D 7/0224 290/44 |
| 2011/0084485 A1* | 4/2011 | Miranda | H02P 9/04 290/44 |
| 2011/0305568 A1* | 12/2011 | Brath | F03D 7/046 416/1 |
| 2013/0115082 A1 | 5/2013 | Rogers et al. | |
| 2013/0140819 A1 | 6/2013 | Abdallah et al. | |
| 2015/0147173 A1* | 5/2015 | Agarwal | F03D 17/00 416/43 |
| 2016/0017865 A1 | 1/2016 | Illing | |
| 2016/0265510 A1* | 9/2016 | Chacon | F03D 7/0228 |
| 2017/0152835 A1 | 6/2017 | Bønding et al. | |
| 2018/0017039 A1* | 1/2018 | Davoust | F03D 7/04 |

FOREIGN PATENT DOCUMENTS

| | | | |
|---|---|---|---|
| CN | 104865401 A | 8/2015 | |
| CN | 105980703 A | 9/2016 | |
| CN | 107850050 A | 3/2018 | |
| DE | 29715248 U1 | 12/1998 | |
| EP | 0115859 B1 * | 5/1988 | F03D 7/04 |
| EP | 3133282 A1 | 2/2017 | |
| JP | 2016-89732 A | 5/2016 | |
| WO | 2009/071882 A2 | 6/2009 | |
| WO | 2012/110173 A2 | 8/2012 | |
| WO | 2014/131831 A1 | 9/2014 | |

OTHER PUBLICATIONS

Van et al., "Advanced Pitch Angle Control Based on Fuzzy Logic for Variable-Speed Wind Turbine Systems", IEEE Transactions On Energy Conversion, vol. 30, No. 2, Jun. 2015, pp. 578-587.

* cited by examiner

METHOD FOR OPERATING A WIND TURBINE, WIND TURBINE, AND WIND PARK

BACKGROUND

Technical Field

The present invention concerns a method for operating a wind turbine, a wind turbine using the method, and an associated wind park.

Description of the Related Art

In the field of wind turbines, it is known that the wind turbine control system implements a so-called pitch control, i.e., adjustment which sets a blade angle about a longitudinal axis of the rotor blades in order to set a desired operating point. The pitch angle of the rotor blades has a significant effect on the aerodynamic performance of the rotor, wherein at a constant blade angle or pitch angle, the aerodynamic power produced increases as the wind speed rises and can produce dangerous loads, in particular on the tower.

In particular, if, for example, strong gusts occur, the wind speed varies greatly within a very short time while the rotor blades are positioned at small blade angles for low wind. The small blade angle together with the strong wind produced by the wind gusts leads to a high rotor thrust, which may lead to extreme tower loads and high tower load oscillation amplitudes.

According to the invention, extreme loads are reached in particular in the limit state region, which means a state of a structure and the loads acting thereon which, if exceeded, no longer complies with the design requirements. The design requirement for the limit state is therefore intended to keep the probability of reaching the limit state below a prescribed value, see ISO 2394.

In the priority application of the present PCT application, the German Patent and Trademark Office has researched the following prior art: US 2013/0115082 A1 and US 2017/0152835 A1.

BRIEF SUMMARY

Provided is a method for operating a wind turbine and an associated wind turbine so as to reduce the extreme loads acting on the tower. More generally, provided is a technique for a reduction in operating loads on operation of a wind turbine.

According to a first aspect, provided is a method for operating a wind turbine. The wind turbine comprises an aerodynamic rotor with at least one rotor blade which is mounted on a rotor hub of the rotor, wherein a blade angle of the at least one rotor blade is adjustable about its longitudinal axis relative to the rotor hub. The method comprises the following steps: i) providing current wind properties, ii) providing an actual blade angle of the rotor blade or an average value of all actual blade angles of the rotor blades, iii) determining a steady-state blade angle of the at least one rotor blade which, taking into account known rotor properties, the electrical system and the wind properties, leads to a desired steady operating state of the wind turbine, iv) comparing the steady-state blade angle with the actual blade angle or the average value of all actual blade angles, v) adapting an operation of the wind turbine if the steady-state blade angle differs significantly from the actual blade angle or the average value of all actual blade angles.

The method thus allows, for certain specific wind properties such as for example a wind speed and/or a wind direction, determination of a blade angle—known as the steady—state blade angle—which leads to the desired turbine state. The method accordingly allows early detection of the occurrence of gusts and active control of the wind turbine, for example by turning the rotor blades out of the wind. In contrast to speed control, the control system allows a substantial time advantage which results in a reduced maximum load on the tower, in particular in the case of strong gusts. The method can accordingly be implemented as a precontrol in the control design of the wind turbine.

Because the precontrol only adapts the operation if the established deviation is significant, it provides that the number of control interventions is reduced. Thus, the frequency of change of the applicable rotor blade angle is reduced, which has a positive effect on the service life of the wind turbine and in particular the pitch components.

The "significance" of the deviation also prevents determination errors, i.e., estimation errors, in the wind conditions from leading to false reactions. In particular, reaction occurs if the difference between "actual" and "nominal" is greater than would be expected purely from estimation uncertainties. The estimation uncertainties to be expected, for example in the form of an expected value or standard deviation or multiples thereof, are therefore preferably criteria for the significance.

In addition, the method allows a reaction independently of type and form of gusts, since it is not the gusts as such which are detected, but the significance of the change. Even in cases of certain gusts, which for example initially involve a weakening of the wind before the clear strengthening of the wind, the method therefore prevents the control system from having a counter-productive effect at the start of occurrence of the gust, namely firstly reducing the rotor blade angle as the wind falls. Then when the wind rises strongly, this would lead to a greater discrepancy between the steady-state blade angle and the actual blade angle, which however is suppressed or weakened precisely by the significance check.

The desired operating state of the wind turbine is preferably an operating state in which the wind turbine produces nominal power. Accordingly, in this desired operating state, the wind turbine would always be operated with the nominal rotation speed, so that the speed control of the wind turbine is independent of the method in one embodiment.

Preferably, the desired steady operating state comprises a desired aerodynamic power achieved by the rotor. Naturally, the operating state is not restricted to the aerodynamic power, and other operating variables, in particular concerning the power, may also be used. For example, the electrical power generated or fed into the network could be used as a steady operating state, and converted by suitable means.

In further embodiments, the method may however also be linked to speed control, for example as a precontrol, so that the control system also intervenes on gusts, i.e., changes in wind properties, which lie below the nominal speed and hence do not allow a rated output of the wind turbine. In this sense, the desired operating state is accordingly not restricted to the rated output.

The actual wind properties are provided by means of known methods. Suitable methods are for example anemometer measurements but also a wind estimator, LIDAR or comparable methods. Preferably, the determined or provided wind properties are assumed to be steady for the method, i.e., no prediction or similar of wind properties is required.

In the desired operating state, the rotor of the wind turbine achieves a desired aerodynamic power which also depends on the actual wind properties. It must be noted here that detection of the change in wind speed, for example the form or profile of the gusts, is not restricted by the method. This means that the method does not require observation or monitoring of wind properties, for example the wind speed, but considers exclusively the wind properties currently provided. However, using the method, intervention in the operation of the wind turbine takes place only on strong changes in wind speed, since the difference between the actual blade angle and the steady-state blade angle on small changes is compensated by the control of the wind turbine with some delay. Only on great or rapid changes in wind speed does the slow reaction of the control system ensure correspondingly significant deviations of the steady-state blade angle from the actual blade angle.

Accordingly, using the method, the pattern or type of gust is not detected, but the method processes only the occurrence of great changes in wind speed, i.e., in particular changes above 2 m/s and particularly above 5 m/s, within a short time, i.e., in particular less than 4 s and particularly less than 2 s, both rising and falling, so as to lead to a reduction in the resulting extreme loads on the tower. The central advantage of the method is the early detection and for example the resulting early feathering of the blades, which offers a significant time advantage in comparison with the previously known solutions for controlling wind turbines.

In a preferred embodiment of the method, in addition a provided rotation speed is used to determine the steady-state blade angle. The rotation speed or the tip speed ratio derived therefrom allows the steady-state blade angle to be determined precisely.

In a preferred embodiment of the method, the steady-state blade angle deviates significantly from the actual blade angle or the average value of all actual blade angles when the deviation exceeds a threshold value or exceeds a system of multiple threshold values, wherein the threshold value or values preferably lie in a range from 2° to 3°. Preferably, in one embodiment, the adaptation of operation of the wind turbine depending on the steady-state blade angle accordingly comprises: vi) determining a deviation of the steady-state blade angle from the actual blade angle of the rotor blade or from an average value of the actual blade angles of several rotor blades, vii) comparing the deviation with a first predefined threshold value, preferably between 2° and 3°, and viii) adapting an operation of the wind turbine if the deviation exceeds the first predefined threshold.

In the simplest example, single threshold values serve to assess whether or not the required significance is present. Derivatives and combinations of threshold values and complex functions, e.g., staggered threshold values, are also conceivable. Also, more than one input variable may be used, i.e., more than the deviation of the steady-state blade angle from the actual blade angle or the average value of all actual blade angles, for example, additionally measured or estimated speeds.

According to this embodiment, initially a deviation of the steady-state blade angle from the actual blade angle of the rotor blade or blades is determined. The average value of the actual blade angles of several rotor blades is particularly useful if the blades allow individual blade adjustment. This determined deviation is then compared with the first predefined threshold value, and the operation of the wind turbine is adapted only if the deviation exceeds the first predefined threshold value. In principle, adaptation of the operation may naturally also be carried out directly without the threshold value being exceeded, for example the blade angle may be set directly to the steady-state blade angle.

Although such a wind turbine would in theory or in simple terms automatically be perfectly controlled, i.e., rotation speed and power would be optimally regulated, errors in the provided wind properties would lead to increased loads or overspeed/underspeed, so for this reason the steady-state blade angle is not set directly. The threshold value of the deviation between the steady-state blade angle and the actual blade angle accordingly allows the continuation of the known rotation speed and/or power control, and only leads to adaptations if this deviates by a significant factor, for example between 2° and 3°, from the steady-state blade angle which was determined via the provided wind properties.

In the context of this disclosure, in particular the term "threshold value" must be understood in a broad sense and not be restricted to a fixedly predefined value. Accordingly, ramps or systems of multiple threshold values also fall under the term "threshold value". In particular, threshold values provided as ramps may depend on a further parameter, including a tower head speed, a wind speed, etc. Derivatives and combinations of threshold values and complex functions, for example staggered threshold values, are also conceivable. Also, more than one input variable may be used, for example, several measured or estimated speeds.

The tower head in the present case preferably means the top 50% of the height of the tower of the wind turbine. Particularly preferably, the tower head refers to the top 20%, and in particular the top 10% of the tower. In particular, in the scope of this disclosure, in the context of the load/load change rate, gondola/tower head speed, this concerns mainly movements of the tower head in the longitudinal direction perpendicular to a height direction of the tower. Quite particularly, the longitudinal movements parallel to the wind direction are relevant. For the longitudinal movements of the gondola, i.e., the movements which do not concern a rotary movement of the gondola, the tower head speed may be equated to the gondola speed. In other words, the tower head speed may be designated and determined as a longitudinal movement or translational movement of the gondola.

In a preferred embodiment, the operation of the wind turbine is adapted proportionally to the deviation between the actual blade angle or the value of all blade angles and the steady-state blade angle. Until a specific deviation is reached therefore, merely a reduced adaptation of operation of the turbine takes place.

In a further preferred embodiment, the method furthermore comprises: ix) determining a longitudinal speed of a tower head of the wind turbine in the direction of the wind and/or a tower load change rate, x) comparing the longitudinal speed of the tower head and/or the tower load change rate with a second predefined threshold value or system of multiple threshold values. The operation of the wind turbine is adapted only if the longitudinal speed of the tower head and/or the tower load change rate exceeds the second predefined threshold value.

Adaptation of the pitch angle, in particular an increase in the pitch angle, leads directly to a reduction in rotor thrust. Accordingly, increasing the pitch angle or adapting the operation of the wind turbine could be advantageous or also counter-productive depending on the position of the tower head in the oscillating movement. According to this embodiment, the speed of the tower head is used as a further condition for adapting the operation of the wind turbine. This prevents the performance of adaptations which are counter-productive for tower loads or tower oscillation.

The speed of the tower head and/or gondola of the wind turbine is preferably estimated and/or calculated and/or measured. Here for example, strain gauges in the tower or accelerometers arranged in the tower head may be used in the known fashion. However, naturally other methods are conceivable for determining the tower head speed.

The second predefined threshold value preferably corresponds to a speed component of the tower head towards the rear, i.e., away from the rotor, by a specific amount. Accordingly, preferably the rotor blades are feathered, i.e., the pitch angle increased, only when the tower head oscillates towards the rear with a specific speed, while adaptation of the operation of the wind turbine, i.e., in particular feathering of the blades, does not take place when the tower head is oscillating forward.

In a preferred embodiment of the method, the second predefined threshold value or system of multiple threshold values lies in an order of magnitude from 0.1 m/s to 0.5 m/s for the longitudinal speed of the tower head. The range may naturally be adapted according to the area of application and in particular the size of the wind turbine.

In a preferred embodiment of the method, the second predefined threshold value or system of multiple threshold values is formed depending on the significance of the deviation of the steady-state blade angle from the actual blade angle or the average value of all actual blade angles. In other words, the greater the deviation of the steady-state blade angle from the or the momentary blade angles, the greater or smaller the second threshold value or system of multiple threshold values may be selected.

In a preferred embodiment of the method, the significance of the deviation of the steady-state blade angle from the actual blade angle or the average value of all actual blade angles is implemented as a complex function of the tower loads, in particular as a function of the longitudinal speed of the tower head.

In a preferred embodiment of the method, the method intervenes as a precontrol in the control design for regulating the power of the wind turbine. A precontrol allows early detection of and intervention in changing situations, e.g., in the present case the occurrence of a gust.

In a preferred embodiment of the method, the method furthermore comprises providing a current rotor-effective wind speed, wherein the steady-state blade angle of the at least one rotor blade is determined on the basis of the current rotor-effective wind speed. The rotor-effective wind speed is the wind speed which effectively acts on the rotor in order for example to generate a specific or measured aerodynamic power. It is used to estimate a wind speed effectively acting on the rotor, without for example needing direct measurement of the wind speed by means of an anemometer. Thus inaccuracies in measurement of the wind speed and/or direction may be reduced.

In a preferred embodiment of the method, adapting the operation of the wind turbine comprises setting a minimum blade angle to the determined steady-state blade angle less a tolerance band, wherein the tolerance band is preferably from 1° to 3°.

As already stated, it is possible to directly set the minimum blade angle to the determined steady-state blade angle. However, it is advantageous to provide the tolerance band around the steady-state blade angle. Thus according to this embodiment, the operation is adapted such that the minimum blade angle is indeed lower than the steady-state blade angle but higher than the currently set actual blade angle. This may prevent estimation errors in the system leading to the setting or approaching of too high a steady-state blade angle, in other words overshooting the target by the method.

Alternatively or additionally, in one embodiment the operation of the wind turbine is adapted by lowering the power, for example, by means of the generator moment or directly as the nominal value of the power.

In a preferred embodiment of the method, adapting the operation of the wind turbine comprises lowering the rotation speed. Lowering the rotation speed in particular is connected with a reduction in power.

In a preferred embodiment of the method, the current rotor-effective wind speed is estimated based on an air density, a power coefficient map, the actual blade angle, a rotation speed of the wind turbine, and an aerodynamic power of the rotor.

The air density may for example be obtained from meteorological data or determined directly by measurements at the wind turbine. The power coefficient map is preferably the map present in the wind turbine and often designated the $c_P$ map. Using the operating point thus represented, preferably a wind speed can be determined which corresponds to these environmental parameters and is known as the rotor-effective wind speed. As already stated initially, evidently other forms of wind estimator are conceivable for determining the rotor-effective speed.

In a preferred embodiment of the method, an aerodynamic power of the rotor is calculated from a turbine power balance, wherein the turbine power balance preferably comprises: a) electrical power fed into a power network, b) heat losses which are measured or suitably modelled, and c) power used for rotor and generator acceleration.

The electrical power of the wind turbine (P electric) is preferably transferred by efficiency model into an air gap moment which is used for power determination. An acceleration power part, which in turn is determined from the rotor speed and an inertia of the rotor, acts as an additional component to this air gap moment. This correction factor expresses which part of the aerodynamic power is consumed by the acceleration of the rotor itself.

In a preferred embodiment of the method, the steady-state blade angle of the at least one rotor blade is determined as a function of a calculated tip speed ratio and a calculated nominal power coefficient, wherein a) the tip speed ratio is calculated as a function of the wind properties provided, a rotation speed of the wind turbine and a diameter of the rotor, and/or b) the nominal power coefficient is calculated as a function of the wind properties provided, the diameter of the rotor, a nominal value of the electrical power, and the air density.

Preferably, in this embodiment, accordingly the steady-state blade angle is expressed as a function of two variables, namely the tip speed ratio and the power coefficient, and may be stored for example in the form of a two-dimensional table. Accordingly, when the two input parameters are provided, a desired steady-state blade angle can be read from the stored table. The steady-state blade angle may also naturally be calculated directly, without stored values, from the input variables using a predetermined function. The nominal value of the electrical power is used for determining the nominal power coefficient, preferably using an efficiency model, i.e., taking into account efficiency losses. The nominal value of the electrical power in particular characterizes the desired operating state of the wind turbine, for example, the nominal value of the electrical power is approximately the rated output.

In a preferred embodiment, the rotation speed is approximately the rated rotation speed and the power is approximately the rated output, otherwise on a change in wind speed there would be no significant effects on the expected tower loads. In this embodiment, the problem of determining the steady-state blade angle is reduced by one dimension, namely by the power coefficient, and is dependent substantially one-dimensionally only on the estimated wind speed. This allows an implementation which is particularly simple in design, since determining the steady-state blade angle can be implemented as a list of a steady-state blade angles over tip speed ratios. The particular advantage of this embodiment is achieved if the actual rotor-effective wind speed is used as an input both for determining the nominal power coefficient and also for determining the tip speed ratio.

In a preferred embodiment of the method, the tip speed ratio is the nominal tip speed ratio. As an approximation and in other embodiments, instead of the nominal tip speed ratio, the actual tip speed ratio may be used.

The precontrol particularly suitable for strong gusts according to the method accordingly preferably uses a $c_P$ map to estimate the wind speed. The function capacity of the method is influenced by actual deviations from the map and hence by estimation errors. If however, instead of optimum blade polars, for example poorer blade polars of soiled rotor blades are assumed, it has been found that these generally lead to lower loads on the tower. Accordingly, it must be assumed that the system responds generously to imprecise input data. This means that estimation errors—if they occur—indeed lead to an underestimation of the wind speed and to a smaller nominal blade angle, but these are in any case partially compensated by the change in polars due to the soiling. As a result, accordingly the tower load may be even lower.

In a preferred embodiment of the method, the determination of the steady-state blade angle comprises the following steps: providing a sensitivity, in particular in the form of tabular values, of the rotor to blade angle changes, wherein the sensitivity is provided as a ratio of the change of aerodynamic power to a change of rotor blade angle as a function of a tip speed ratio; determining the steady-state blade angle on the basis of the actual blade angle or the average value of all actual blade angles using the sensitivity, in particular by step-by-step integration of the sensitivity until the desired aerodynamic power is reached.

According to a second aspect, provided is a wind turbine comprising an aerodynamic rotor with at least one rotor blade mounted on a rotor hub of the rotor, wherein a blade angle of the at least one rotor blade is adjustable about its longitudinal axis with respect to the rotor hub. The wind turbine comprises a controller which is configured to operate the wind turbine using a method according to at least one embodiment of the first aspect.

According to a third aspect, provided is a wind park with several wind turbines according to the second aspect.

The wind turbine according to the second aspect, and the wind park according to the third aspect, allow the same advantages to be achieved as have been described with reference to the method according to the first aspect. Also, all embodiments described with reference to the method according to the invention and their associated advantages can be transferred to the wind turbine according to the invention and to the wind park according to the invention.

BRIEF DESCRIPTION OF THE SEVERAL VIEWS OF THE DRAWINGS

Further advantages and embodiments are described below with reference to the appended figures. The drawings show.

DETAILED DESCRIPTION

Figure 1:
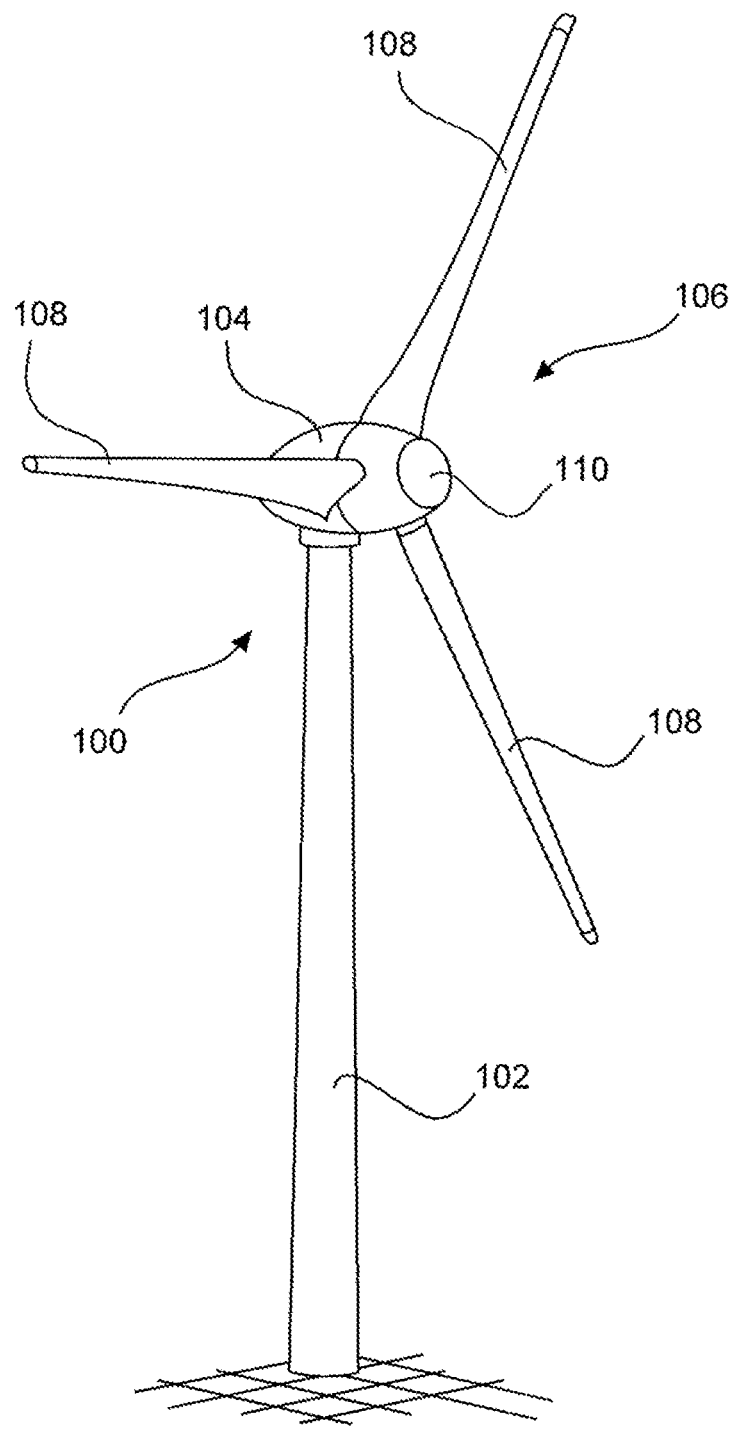
FIG. 1 diagrammatically as an example, a wind turbine.

FIG. 1 shows a diagrammatic depiction of a wind turbine according to the invention. The wind turbine 100 has a tower 102 and a gondola 104 on the tower 102. An aerodynamic rotor 106 with three rotor blades 108 and a spinner 110 is provided on the gondola 104. The aerodynamic rotor 106 is set in a rotational movement by the wind during operation of the wind turbine, and thus also turns an electrodynamic rotor of a generator which is coupled directly or indirectly to the aerodynamic rotor 106. The electrical generator is arranged in the gondola 104 and generates electrical energy. The pitch angle of the rotor blades 108 may be changed by pitch motors at the rotor blade roots of the respective rotor blades 108.

Figure 2:
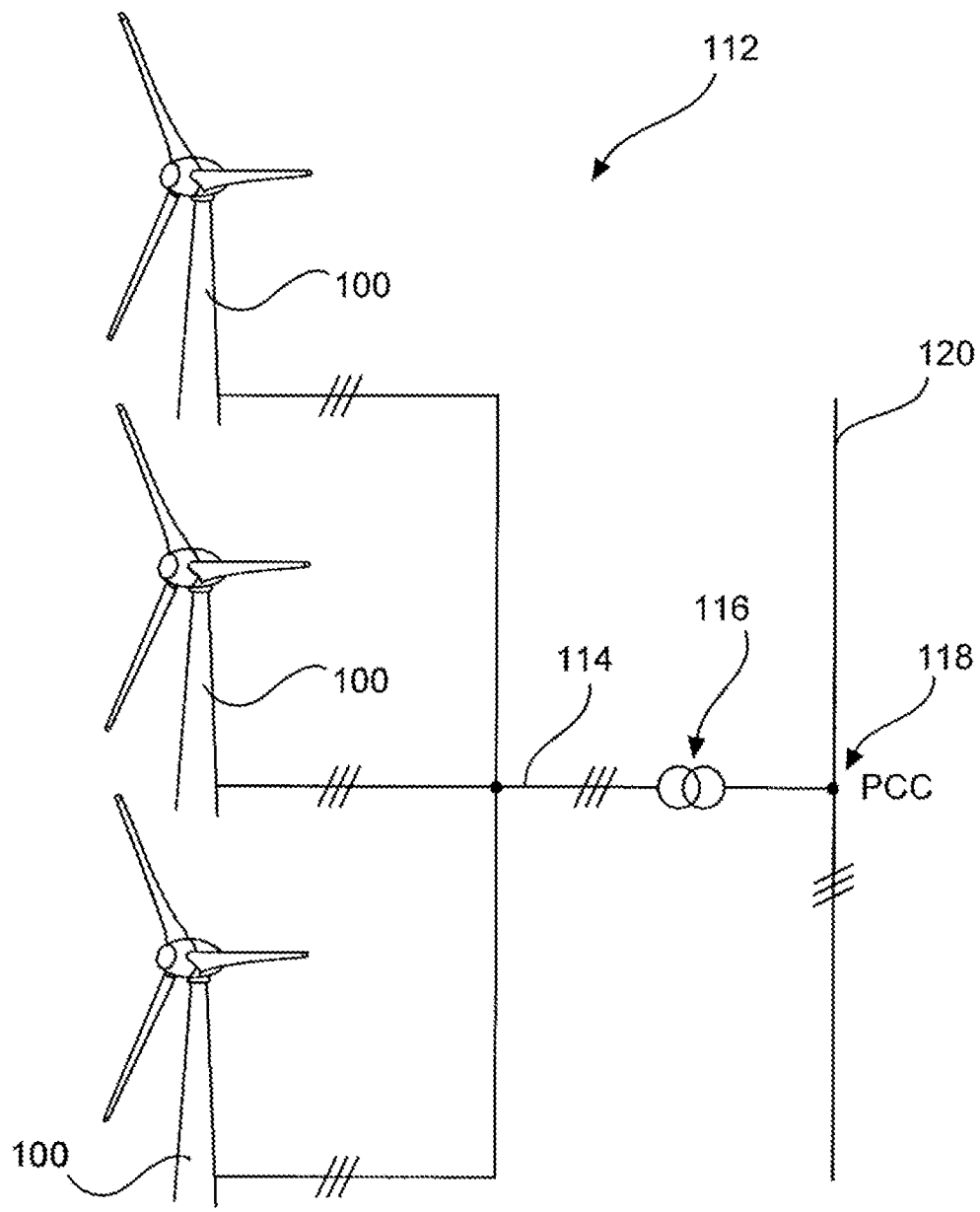
FIG. 2 diagrammatically as an example, a wind park.

FIG. 2 shows a wind park 112 with three wind turbines 100 for example, which may be identical or different. The three wind turbines 100 thus represent in principle an arbitrary number of wind turbines of a wind park 112. The wind turbines 100 provide their power, namely in particular the generated current, via an electrical park network 114. The currents or power levels generated by the individual wind turbines 100 are cumulated and usually a transformer 116 is provided which steps up the voltage in the park in order then to feed it into the supply network 120 at the infeed point 118, generally also known as the PCC. FIG. 2 is merely a simplified depiction of a wind park 112, which for example shows no controller although naturally a controller is present. Also for example the park network 114 may be configured differently, in that for example a transformer may also be present at the output from each wind turbine 100, to name just one other exemplary embodiment.

Figure 3:
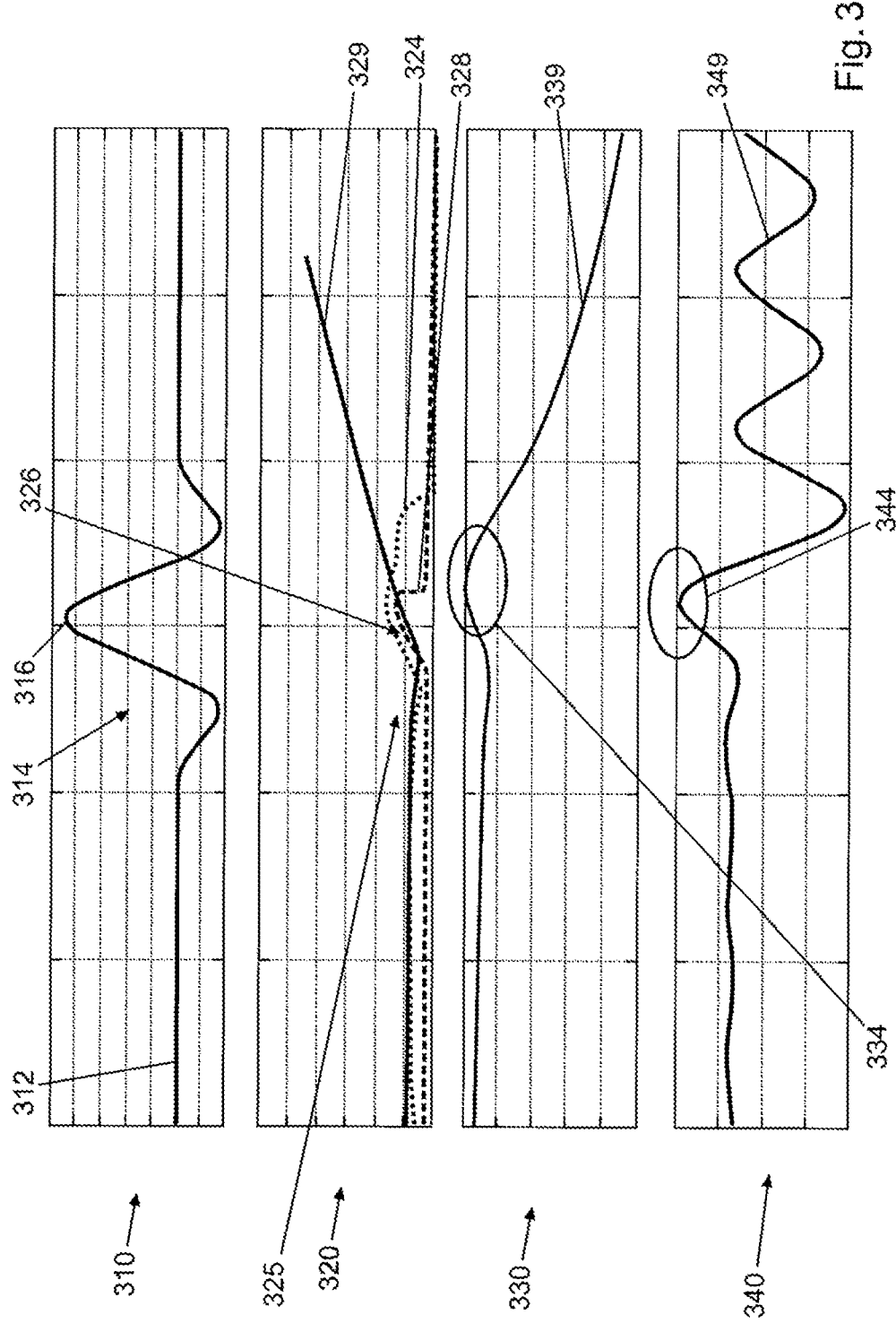
FIG. 3 diagrammatically as an example, the temporal development of the occurrence of a gust in the prior art.

FIG. 3 shows diagrammatically as an example the temporal development of occurrence of a gust and associated controls of the wind turbine and the resulting loads. On the horizontal axis, a period of 30 seconds is shown, which divides into a period from 0 to 10 seconds before occurrence of the gust, a period with a significant change in wind speed, i.e., the gust, from 10 to 20 seconds, and a period from 20 to 30 seconds in which again an approximately constant wind speed prevails. FIG. 3 shows vertically above each other four diagrams each with different applied values. A first diagram 110 shows the wind speed 312 with a so-called extreme operation gust (EOG), i.e., a specific form of a strong gust with initially falling and then greatly rising wind speed.

At the same time as the wind speed shown in diagram 110, a further diagram 320 shows the curve of the blade angle 329, a diagram 313 shows a rotation speed 339 of the rotor, and a diagram 340 shows the loads 349 acting on the tower of the wind turbine. The control of the pitch angle in diagram 320 is particularly interesting; in particular in FIG. 3, after occurrence of a maximum 316 of wind speed, this leads to an overspeed 334 and an extreme tower load 344.

The pitch angle curve 329 is the actual angle of the rotor blades occurring over time at the rotor blades with conventional controllers. This blade angle is determined by fundamental adjustments, wherein the actual curve of the pitch angle 329 is substantially determined by a speed controller, which in this case sets the wind turbine to rated output. The speed controller is overlaid with a so-called alpha-min control which, in order to avoid overloads, determines a minimum pitch angle 328 which is established in the control system as the lower limit of the pitch angle.

It is known that for the minimum pitch angle, a so-called $\alpha_{min}$ control sets a pitch angle present at least on the blade. This guarantees that the pitch angle or angles of the rotor blade or blades is/are not set below a specific pitch angle, which for example leads to excessively high loads on the rotor. Reducing the rotor thrust may then be integrated in the existing $\alpha_{min}$ control or superposed over this in uncomplicated fashion at little cost. This design is distinguished accordingly by a low extra cost for the device and control system.

In a region 325 of an occurring gust, it can be seen that because of the falling wind speed, the speed controller reduces the pitch angle 329 further in the direction of the minimum pitch angle 328, which has devastating consequences for the further development of the gust. When the wind speed rises greatly in region 326, because of the speed controller the pitch angle 329 cannot follow this rapidly. This delay on feathering the blades, i.e., increasing the pitch angle, leads to the extreme rotation speeds 334 or extreme tower loads 344 already indicated.

FIG. 3 furthermore shows the curve of a steady-state blade angle 324 which, taking into account known rotor properties, the electrical system and the wind properties, leads to a desired steady operating state of the wind turbine, in particular to a desired aerodynamic power. Until the gust hits, i.e., during the initially reducing wind speed, the actual value of the pitch angle 329 and the steady-state blade angle 324 run in parallel. In region 326 of strong rise, it can be seen that the steady-state blade angle 324 rises temporally significantly before the minimum pitch angle 328 of the known alpha-min control. Use of the steady-state blade angle 324 as precontrol and hence for intervention in operation of the wind turbine accordingly brings advantages precisely in the region 326, as will be clearly indicated below with reference to FIG. 4.

Figure 4:
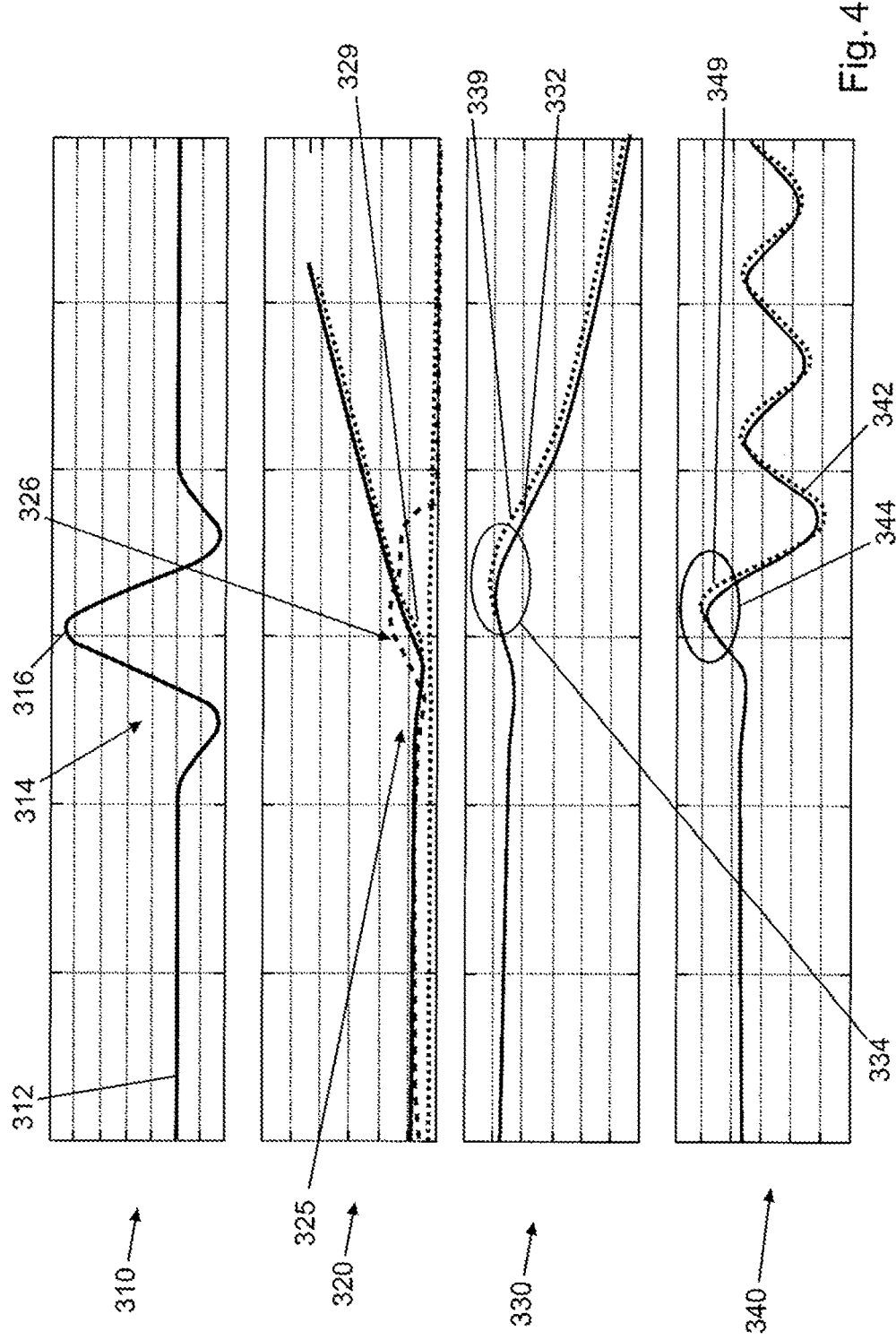
FIG. 4 diagrammatically as an example, the temporal development from FIG. 3 according to the method of the present invention.

FIG. 4 shows diagrammatically as an example the controller according to the invention in comparison with a conventional control system shown in FIG. 3. A conventional curve of the pitch angle 329 differs from the curve 322 according to the invention in that, according to the invention, the steady-state blade angle 324 intervenes in the control system as a precontrol. At the time in region 326 of the gust, feathering conventionally takes place a few seconds later, namely only when the peak speed of the gust has already been reached. In contrast, with the control method according to the invention, according to the curve of the pitch angle 322, the blade angle is increased early, which as a result leads to a reduction in peak loads. The differences with the method according to the invention are also evident in diagrams 330 and 340. According to the invention, in particular in the extreme region, the rotor speed 332 lies below the rotation speed 339 which is reached with conventional control systems. In the region of the tower loads, a reduction of up to 10% in the extreme value can be achieved.

Figure 5:
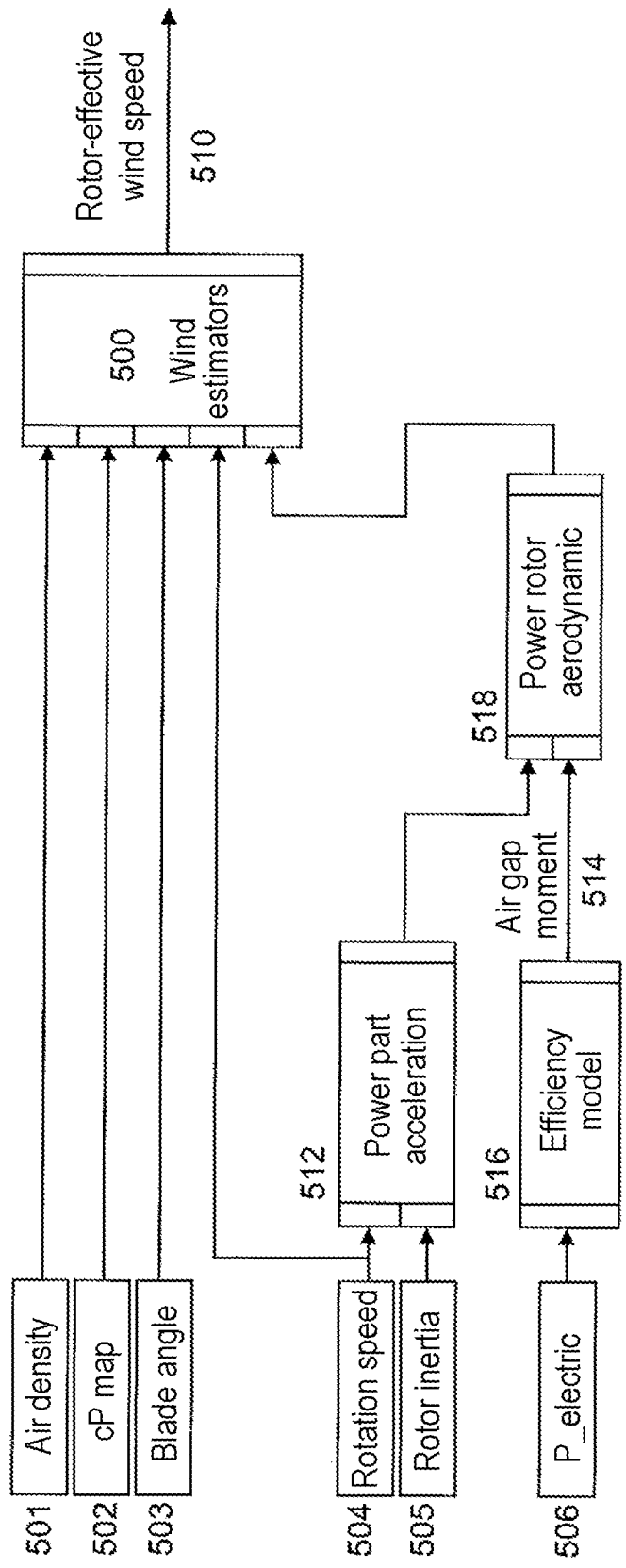
FIG. 5 diagrammatically as an example, a wind estimator.

FIG. 5 shows diagrammatically as an example a wind estimator 500. The wind estimator 500 processes different input variables in order to obtain a rotor-effective wind speed 510.

Firstly, the wind estimator 500 obtains an air density 51, a $c_P$ map 502 and a current blade angle 503 of the rotor blades.

Further parameters which influence the wind estimator 500 are the rotation speed 504, a rotor inertia 505 and the electrical power 506. The rotation speed 504 and rotor inertia 505 are converted into a power part for the acceleration 512 and combined with an air gap moment 514, which was derived from the electrical power 506 by means of an efficiency model 516, in order to give the aerodynamic power of the rotor 518.

Figure 6:
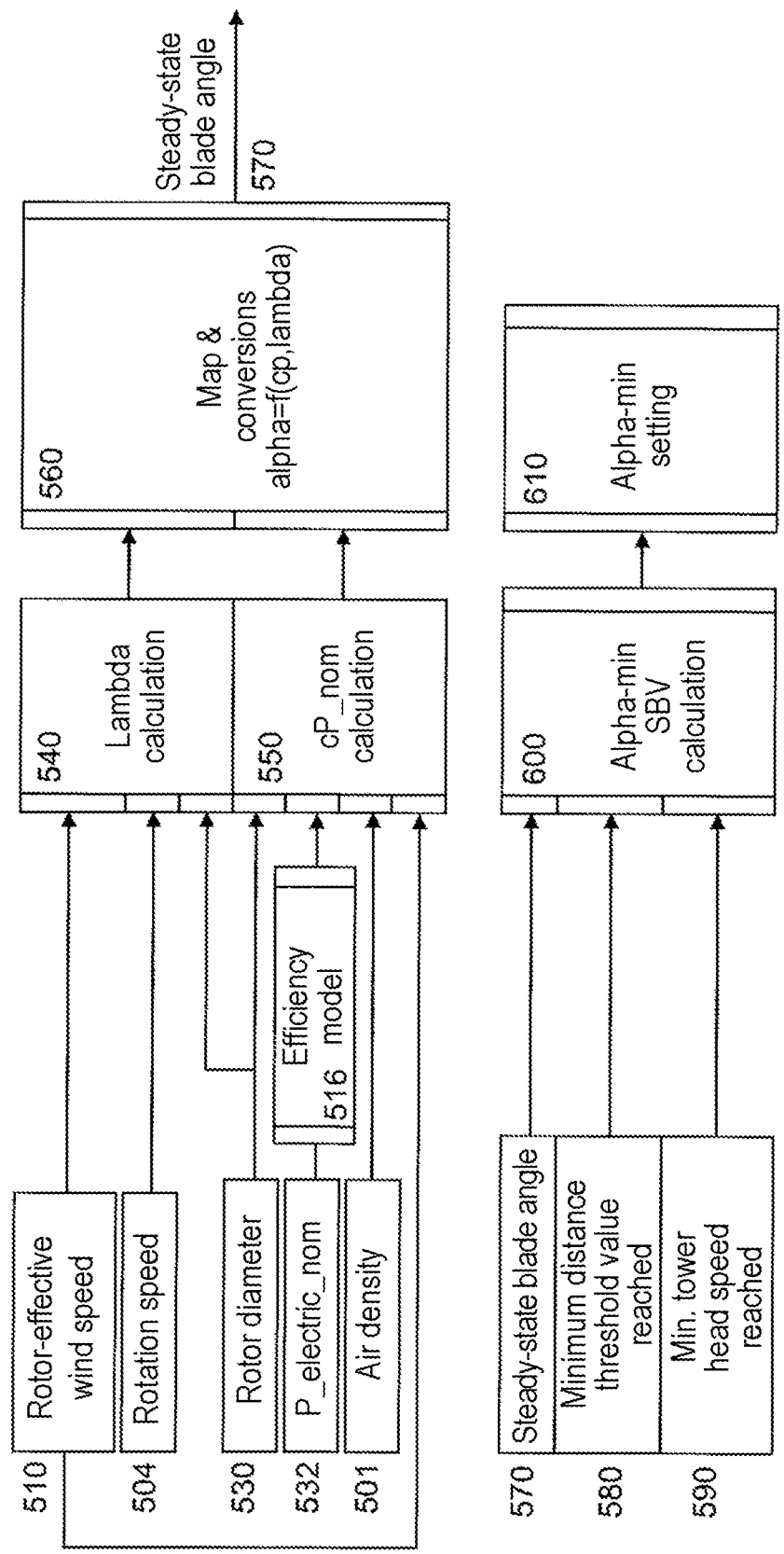
FIG. 6 diagrammatically as an example, the method of strong gust precontrol.

FIG. 6 shows diagrammatically as an example the strong gust precontrol. The rotor-effective wind speed 510 is used together with the rotation speed 504 and a rotor diameter 530 to calculate the tip speed ratio lambda in a step 540. The calculated tip speed ratio lambda may be either the actual tip speed ratio or the nominal tip speed ratio which results from the rotor-effective wind speed 510.

Furthermore, from the rotor-effective wind speed 510, together with the rotor diameter 530 and an electrical nominal power 532 converted by means of an efficiency model 516, in step 550 a nominal value of the power coefficient $c_P$ is calculated. The nominal value of the electrical power 532 is frequently the rated output, since there is a risk of extreme loads in particular in this region.

In a step 560, based on the tip speed ratio determined in step 540 and the nominal value of the power coefficient determined in step 550, a steady-state blade angle 570 is determined. The steady-state blade angle is preferably defined as a function of both the power coefficient and the tip speed ratio, and may be stored for example in the form of a map or similar. In the region of the rated output of the wind turbine, the dimensionality may be reduced to one dimension, namely the tip speed ratio.

In the block circuit diagram of FIG. 6, the steady-state blade angle 570 is then calculated together with two further conditions, in a step 600, into a minimum blade value for a strong gust precontrol (SBV). This minimum blade value is then fed into the control system of the turbine in a step 610.

The strong gust precontrol is calculation in step 600 based on the estimated steady-state blade angle 570. For this, it is checked whether a minimum distance threshold value 580 has been reached. Only when the steady-state blade angle deviates from the actual blade angle by at least the minimum distance threshold value 580 does the control system intervene in order to avoid false tripping and possible loss of yield. A further condition for the control system is whether the tower head of the wind turbine has reached a minimum speed 590. The minimum speed is in particular that in the direction of the rotor to the rear, so that the thrust reduction, i.e., from feathering the rotor blades, i.e., increasing the pitch angle, does not amplify the tower oscillation and hence lead to an undesirable reaction. The reduction in thrust is however particularly useful precisely when the tower is swinging back, so that inclusion of this condition constitutes a further improvement.

Figure 7:
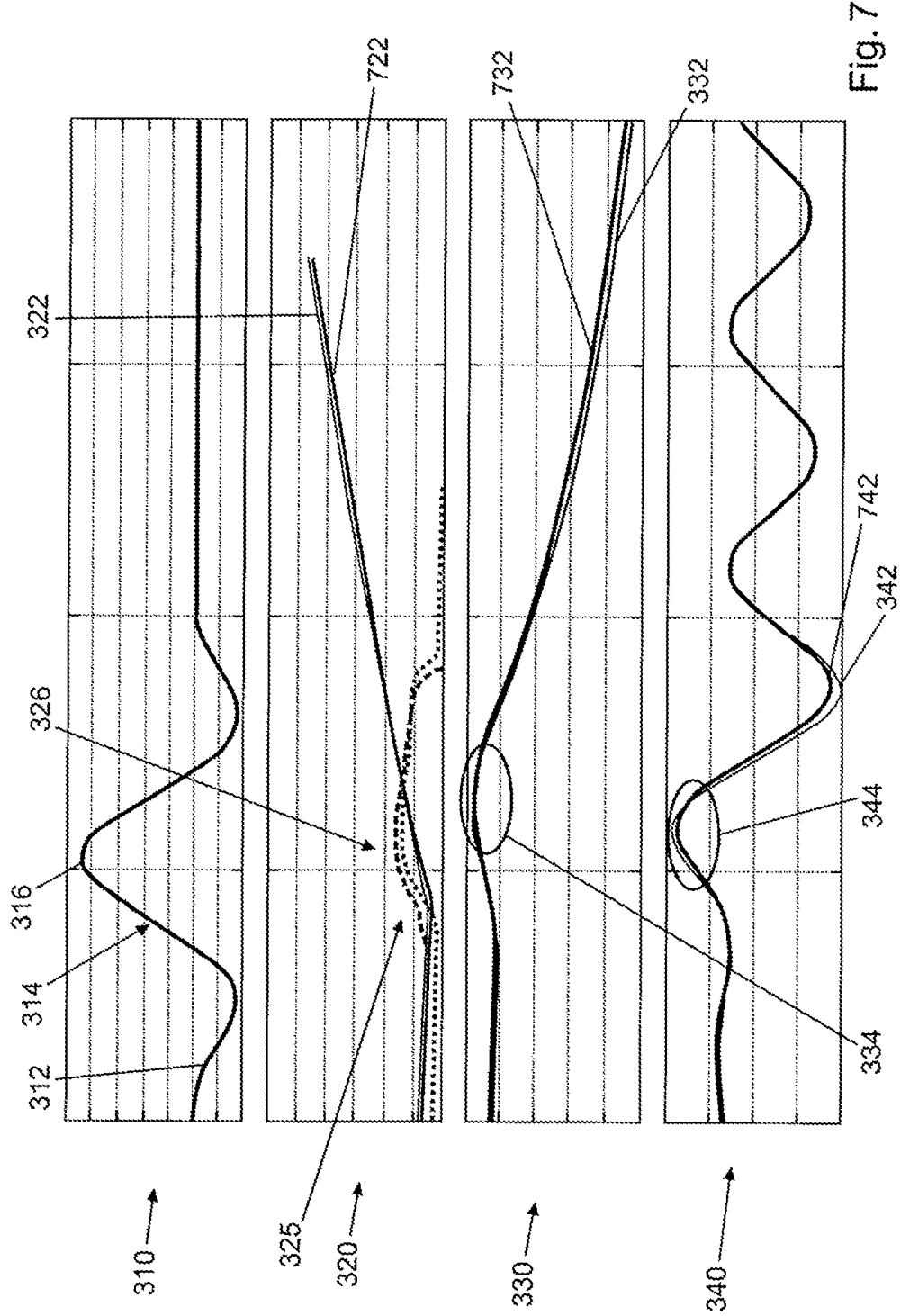
FIG. 7 diagrammatically as an example, the strong gust precontrol with profile polars of soiled rotor blades.

FIG. 7 finally shows diagrammatically as an example similar views to FIGS. 3 and 4, namely curves of the wind speed 300, blade angle 310, rotor speed 320 and tower load 340. FIG. 7 illustrates the temporal extract around the gust 314 and sketches the case in which the applied polars of the rotor blades correspond to those of soiled rotor blades. In the basic case in FIG. 7, the control system of the turbine assumes an optimum map of the power coefficient (for a clean blade), while the effect is simulated with soiled, i.e., aerodynamically poorer rotor blades. While the blade angle 722 with simulated poor profile polars is slightly less than the blade angle 322 with clean profiles, it can be seen that the maximum rotation speed 334 is substantially identical between the rotation speed curves 332 and 732 with soiled profile polars, and the maximum extreme loads on the tower 344 to be expected are even slightly lower for the soiled rotor blades 742. Thus, poorer profile polars of the rotor blades in comparison with the applied power coefficients (i.e., optimum power coefficients are assumed and actually poorer power coefficients occur due for example to soiling of the blades) can even lead to lower extreme loads than with the actually assumed values.

The invention claimed is:

1. A method comprising:
   operating a wind turbine, wherein the wind turbine comprises an aerodynamic rotor with at least one rotor blade mounted on a rotor hub of the rotor, wherein a blade angle of the at least one rotor blade is adjustable relative to the rotor hub about a longitudinal axis of the at least one rotor blade, wherein the operating comprises:
   providing current wind properties,
   providing an actual blade angle of the rotor blade or an average value of all actual blade angles of the rotor blades,
   determining a steady-state blade angle of the at least one rotor blade, wherein the steady-state blade angle, taking into account known rotor properties, the electrical system, and the current wind properties, leads to a desired steady operating state of the wind turbine,
   comparing the steady-state blade angle with the actual blade angle or the average value of all actual blade angles, and
   using the steady-state blade angle as a feed-forward control in the control design for power regulation of the wind turbine if the steady-state blade angle differs from the actual blade angle or the average value of all actual blade angles by a threshold value.

2. The method as claimed in claim 1, wherein the desired steady operating state comprises an aerodynamic power achieved by the rotor.

3. The method as claimed in claim 1, wherein the threshold value of the steady-state blade angle lie in a range from 2° to 3°.

4. The method as claimed in claim 1, wherein adapting the operation of the wind turbine is proportional to the difference between the actual blade angle or average value of all actual blade angles and the steady-state blade angle.

5. The method as claimed in claim 1, further comprising:
   determining a longitudinal speed of a tower head of the wind turbine in a direction of the wind or a tower load change rate, and
   comparing the longitudinal speed of the tower head or the tower load change rate with a second predefined threshold value or a plurality of threshold values,
   wherein adapting the operation of the wind turbine system occurs only if the longitudinal speed of the tower head or the tower load change rate exceeds the second predefined threshold value.

6. The method as claimed in claim 5, wherein the second predefined threshold value or the plurality of threshold values lies in an order of magnitude from 0.1 m/s to 0.5 m/s for the longitudinal speed of the tower head.

7. The method as claimed in claim 5, wherein the second predefined threshold value or the plurality threshold values is formed depending on a deviation of the steady-state blade angle from the actual blade angle or the average value of all actual blade angles.

8. The method as claimed in claim 5, wherein a significance of a deviation of the steady-state blade angle from the actual blade angle or the average value of all actual blade angles is implemented as a function of the tower loads, wherein the significance of the deviation is a measure of how much greater a difference between an actual and a nominal deviation is compared to a difference between the actual and the nominal deviation expected from estimation uncertainties.

9. The method as claimed in claim 8, wherein the function is a function of the longitudinal speed of the tower head.

10. The method as claimed in claim 1, further comprising:
    providing a current rotor-effective wind speed,
    wherein the steady-state blade angle of the at least one rotor blade is determined based on the current rotor-effective wind speed.

11. The method as claimed in claim 1, wherein adapting the operation of the wind turbine comprises setting a minimum blade angle to the determined steady-state blade angle less a tolerance band, wherein the tolerance band is from 1° to 3°.

12. The method as claimed in claim 1, wherein adapting the operation of the wind turbine comprises lowering the rotational speed.

13. The method as claimed in claim 10, wherein the current rotor-effective wind speed is provided as an estimate based on an air density, a power coefficient map, the actual blade angle, a rotational speed of the wind turbine, and an aerodynamic power of the rotor.

14. The method as claimed in claim 1, wherein an aerodynamic power of the rotor is calculated from a turbine power balance, wherein the turbine power balance comprises:
    electrical power fed into a power network,
    measured or modeled heat losses, and
    power used for rotor and generator acceleration.

15. The method as claimed in claim 1, wherein the steady-state blade angle of the at least one rotor blade is determined as a function of a calculated tip speed ratio and a calculated nominal power coefficient, wherein:
    the tip speed ratio is calculated as a function of a current rotor-effective wind speed, a rotational speed of the wind turbine, and a diameter of the rotor, and/or
    the nominal power coefficient is calculated as a function of the current rotor-effective wind speed, the diameter of the rotor, a nominal value of the electrical power, and the air density.

16. The method as claimed in claim 15, wherein the tip speed ratio is a nominal tip speed ratio or a weighted mean between the tip speed ratio and the nominal tip speed ratio.

17. The method as claimed in claim 1, wherein determining the steady-state blade angle comprises:
    providing a sensitivity in a form of tabular values of the rotor to blade angle changes, wherein the sensitivity is provided as a ratio of the change of aerodynamic power to a change of rotor blade angle as a function of a tip speed ratio; and
    determining the steady-state blade angle based on the actual blade angle or average value of all actual blade angles using the sensitivity by step-by-step integration of the sensitivity until the desired aerodynamic power is reached.

18. A wind turbine comprising:
    an aerodynamic rotor with at least one rotor blade mounted on a rotor hub of the rotor, wherein a blade angle of the at least one rotor blade is adjustable about its longitudinal axis with respect to the rotor hub, wherein the wind turbine comprises a controller is configured to:
determine a steady-state blade angle of the at least one rotor blade, wherein the steady-state blade angle, taking into account known rotor properties, the electrical system, and wind properties, leads to a desired steady operating state of the wind turbine,
compare the steady-state blade angle with an actual blade angle or an average value of all actual blade angles, and
cause a usage of the steady-state blade angle as a feed-forward control in the control design for power regulation of the wind turbine if the steady-state blade angle differs from the actual blade angle or the average value of all actual blade angles by a threshold value.

19. A wind park comprising wind turbines as claimed in claim 18.

* * * * *